United States Patent [19]

Kubler

[11] E Re. 30,159

[45] Reissued Nov. 27, 1979

[54] FALSE TWIST-CRIMPING MACHINE

[75] Inventor: Hermann Kubler, Remscheid-Lüttringhausen, Fed. Rep. of Germany

[73] Assignee: Barmag Barmer Maschinenfabrik Aktiengesellschaft, Remscheid-Lennep, Fed. Rep. of Germany

[21] Appl. No.: 964,525

[22] Filed: Nov. 29, 1978

Related U.S. Patent Documents

Reissue of:

[64] Patent No.: 4,058,961
Issued: Nov. 22, 1977
Appl. No.: 701,155
Filed: Jun. 30, 1976

[30] Foreign Application Priority Data

Jul. 5, 1975 [DE] Fed. Rep. of Germany ..... 2530125
Oct. 4, 1975 [DE] Fed. Rep. of Germany ... 7531545[U]

[51] Int. Cl.[2] ..... D02G 1/02
[52] U.S. Cl. ..... 57/291; 57/352
[58] Field of Search ..... 57/284–291, 57/352

[56] References Cited

U.S. PATENT DOCUMENTS

| | | | |
|---|---|---|---|
| 3,165,881 | 1/1965 | Moncuit et al. | 57/291 |
| 3,293,838 | 12/1966 | Batsch | 57/291 X |
| 3,486,320 | 12/1969 | Mattingly et al. | 57/286 |
| 3,501,904 | 3/1970 | Batsch | 57/290 |
| 3,631,664 | 1/1972 | Mackintosh | 57/284 X |
| 3,791,121 | 2/1974 | Ernst | 57/291 X |
| 3,942,312 | 3/1976 | Venot | 57/290 X |
| 3,946,546 | 3/1976 | Venot | 57/291 X |
| 3,962,829 | 6/1976 | Schippers | 57/291 |
| 3,971,200 | 7/1976 | Richter | 57/290 |
| 3,999,360 | 12/1976 | Forin et al. | 57/291 X |

*Primary Examiner*—John Petrakes
*Attorney, Agent, or Firm*—Bell, Seltzer, Park & Gibson

[57] ABSTRACT

A false-twist crimping machine for processing filament yarn. The machine comprises a side frame having a bobbin located thereon for supplying the filament yarn to a delivery means for guiding the yarn to a heating zone. A middle frame carries a cooling zone which receives the yarn as it feeds from the heating zone. A false-twisting means receives the yarn as it feeds from the cooling zone and a take-off means supplies the yarn emitting from the false-twisting means to a winding device located at the middle frame. In assembly, the heating zone slopes at an oblique angle between the side frame and the middle frame and a height-adjustable yarn guide means is positioned at the angle formed between the heating zone and the cooling zone in a manner so that the yarn may run over it along a line substantially tangent from the outlet of the heating zone and along a line substantially tangent to the inlet of the cooling zone.

7 Claims, 3 Drawing Figures

FALSE TWIST-CRIMPING MACHINE

Matter enclosed in heavy brackets [ ] appears in the original patent but forms no part of this reissue specification; matter printed in italics indicates the additions made by reissue.

INTRODUCTION

The present invention relates to a false-twist crimping machine for processing filament yarn and, in particular, to such a machine having an improved heating zone and yarn guide means.

BACKGROUND OF THE INVENTION

False-twist crimping machines operate today at thread speeds greater than 600 meters per minute. However, since the temperature of the heating devices utilized in such machines cannot be increased above certain values for reasons concerned with technical process involved, and since the residence time of the yarn within the heating zone cannot be otherwise shortened, it has become necessary to use heaters having increasingly greater lengths. As a result of these developments, false-twist crimping machines have become very large in their overall size.

Several methods have been proposed in order to reduce the size of such machines made necessary by the increased length of their heater elements. For example, British Pat. No. 1,199,071 leads the yarn over the heating element several times. However, such deflection of hot yarn in the false-twisting zone is technically feasible only if special steps are taken to prevent damage to the yarn and yarn twist blockage at the deflection points. It is also proposed in this British Patent to arrange a second heater horizontally above a service passage located between the side frame delivery bobbin and the middle frame. However, the ease of serviceability of the machine suffers by such an arrangement and there is an added danger of vapor collecting in the zone of the horizontal heater.

BRIEF DESCRIPTION OF THE INVENTION

The present invention provides a false-twist crimping machine whose heating zone for the false-twisted yarn has a greater length, *even in excess of the width of the service passage,* but is well within the space limits necessitated by the ceiling heights normally found in the textile industry. In addition, the machine design of the present invention allows for easy servicing and yarn application *by a machine operator* and eliminates the danger of vapors accumulating in the zone of the heater.

One of the advantages of the machine design of the present invention over those of the prior art is that the service passage, which must always be present and absolutely necessary with such false-twisting machines, is utilized to [accomodate] *accommodate* the heating elements. In this manner the design of the present invention makes better use of the area in which the machine is installed than those of the prior art. Moreover, the removal of vapor from the zone of the heating elements is promoted by the oblique positioning of these elements which results in the further advantage that the input of the heating elements are at a level which can be easily reached without impairing the accessibility of the service passage.

As illustrated below with respect to the preferred embodiment, the long heating element *terminates at a*

*height above the side frame and* may be supported between the side and middle frames. However, it is alternatively possible within the scope of the invention for the heater to be mounted on the middle frame with a cross-piece fitted thereto, or on a support located in the region of the side frame thereby allowing the side frame to remain freely movable.

Yarn may be applied without difficulty in a machine designed in accordance with the present invention since almost all parts to which the yarn must be applied or into which it must be threaded (e.g. delivery mechanisms, heater, false-twister, etc.) lie within reach of the operator. Application of the yarn to the yarn over-run devices located in the area between the heating and cooling zones may be effected simply by means of a manually guided rod. The yarn guide arrangement illustrated in the preferred embodiment serves to increase the reliability of yarn application in this region.

The yarn over-run [devision] *devices* provided in *the region of the apex of* the angle formed by the heating and cooling zones are located in the operating position in a manner such that the yarn is brought into complete contact with the heating and cooling plates. This may be achieved by arranging a single yarn over-run element at or above the point of intersection of lines substantially tangent to the outlet of the heating plate and the inlet of the cooling plate. However, in order to reduce the height of the machine as much as possible and to avoid sharp deflection or bending of the yarn in this area, a plurality of consecutive yarn over-run devices may be utilized. With such an arrangement, the possibility of damage to the still hot yarn running from the heating plate is avoided.

[DESCIRPTION] *DESCRIPTION* OF THE PREFERRED EMBODIMENT

Figure 1:
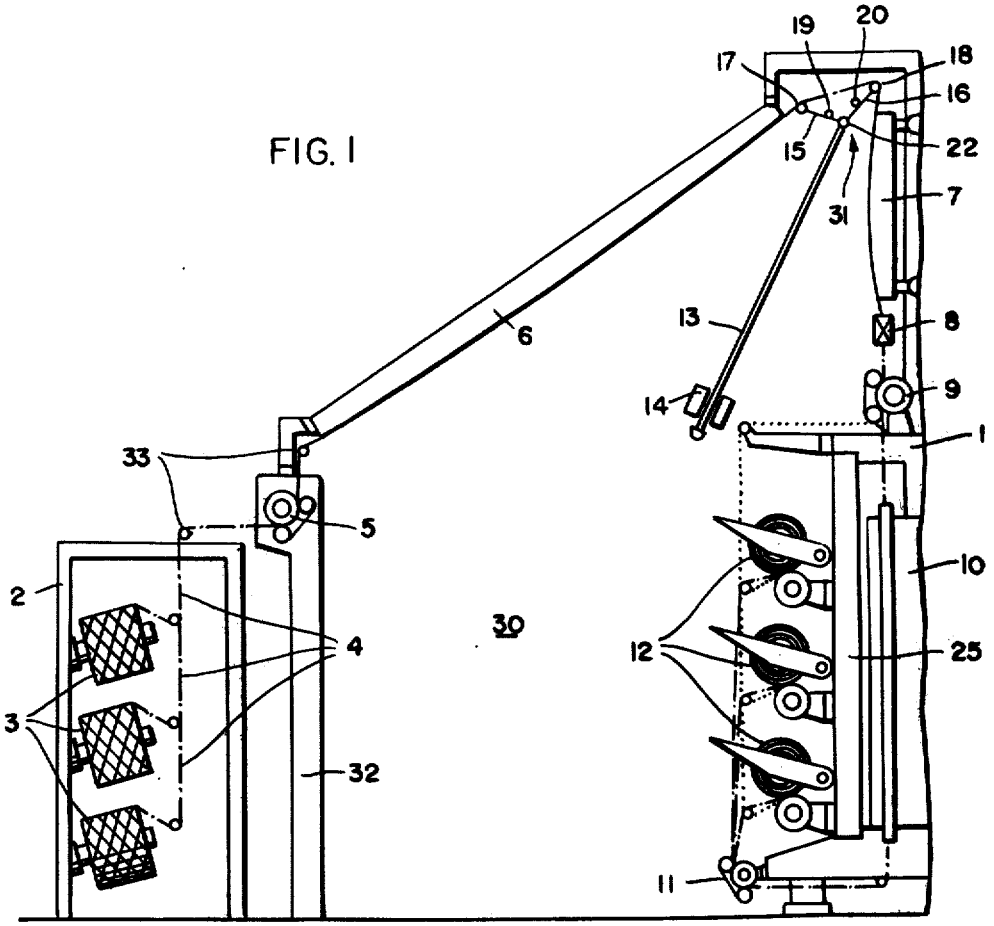
FIG. 1 is a side view in section of a false-twist crimping machine constructed in accordance with an embodiment of the present invention.

FIG. 1 illustrates an embodiment of a false-twist crimping machine constructed in accordance with the present invention. The left hand of the machine is shown having a middle frame 1 and a side frame 2. The half of the machine to the right of middle frame 1 is a mirror image of the illustrated left hand side and, therefore, has not been shown.

Side frame 2 carries delivery bobbins 3 upon which synthetic yarns are wound. Yarns 4, which may be any one of a variety of thermoplastic filaments, are removed from the delivery bobbins 3 by means of a delivery mechanism 5 and then guided *to the inlet end of, and* over a curved heating plate 6. One end of the heating plate 6 and the delivery mechanism 5 are mounted on a support 32 *positioned immediately adjacent side frame 2.* They could alternatively be mounted on a cross-piece (not shown) of middle frame 1 or on the side frame 2. The other end of heating plate 6 is secured on middle frame 1 at an oblique angle of slope with respect to side frame 2. In the preferred embodiment, the surface of heating plate 6 contacted by yarn 4 is directed toward the central passage 30 lying between side frame 2 and middle frame 1 for easy access *by a machine operator.*

However, it also would be possible, but less advantageous, to utilize a heating plate which is pivotal about its longitudinal axis so that it may be swung about in operation in a manner such that its contact surface is facing upwards.

After running *upwardly* through the zone of the heater 6, which may be suitably insulated and covered by a closable flap so as to prevent heat loss, the yarn 4 *exits the outlet end of the heater 6 and* is deflected by a yarn guide 31 having yarn over-run elements 17 and 18 which guide the yarn *downwardly to the closely adjacent inlet end of, and* over cooling plate 7.

After the yarn travels through the zone of cooling plate 7, it is fed to a false-twisting device 8 which may be a conventional false-twist spindle, frictional false-twister or similar device. The yarn is then removed from the false-twisting device by a take-off mechanism 9. In operation, the peripheral speeds of delivery mechanism 5 and take-off mechanism 9 are adjusted so that the yarn in the false-twisting zone is subjected to the desired tension. However, it is to be noted that the synthetic yarn may be [optionaly] *optionally* drawn in the false-twisting zone by a suitable means. After being taken up by take-off mechanism 9, the *processed* yarn may be supplied directly to a winding device 12 mounted on self-supporting plate 25 at the middle frame.

In the illustrated embodiment, there are shown three winding devices 12 corresponding to three delivery bobbins 3 which are all arranged above one another. It should be further noted that the three yarns emitting from delivery bobbins 3 are guided side-by-side in the longitudinal direction of the machine throughout the process and each of them pass through a separate false-twisting device.

After passing through take-off mechanism 9, the yarn may be passed through an additional heater 10 before being supplied to winding device 12. The heating of the yarn in the zone of heater 10 is preferably effected without the yarn contacting any surface. This may be accomplished by passing the yarn through a heater in the form of a heated tube. After passing through heater 10, the yarn is taken up by a further take-off mechanism 11 which supplies it to winding device 12.

Except for the region immediately about the outlet end of the heating plate 6 and in spite of its considerable length, all of the relevant processing parts of the machine are within arms reach for servicing and, in particular, thread application may be quickly effected without assistance by the machine operator.

Figure 2:
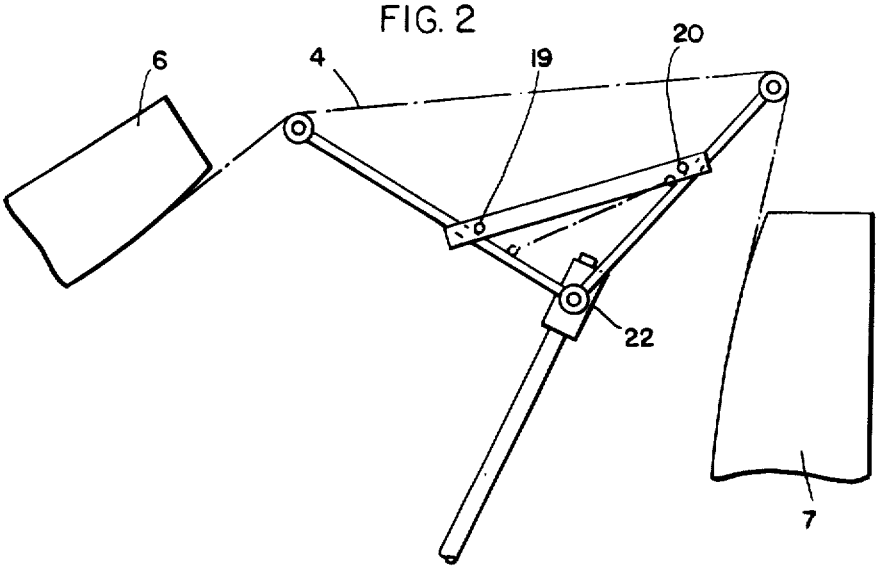
FIGS. 2 and 2A are enlarged side views of the yarn guide means portion of the machine shown in FIG. 1 illustrated in different operating positions.
Figure 2A:
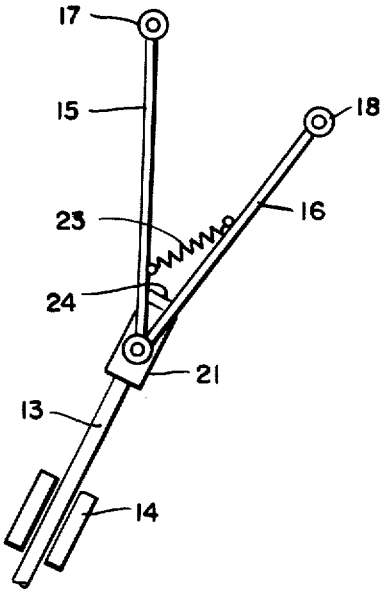

For application of the yarn at the relatively inaccessible outlet end of heating plate 6, the yarn guide device 31 shown in greater detail in FIGS. 2 and 2A is utilized. The device comprises a height-adjustable rod 13 which is guided by means of guides 14 along a path which intersects the angle formed between heating plate 6 and cooling plate 7. Rod 13 may be fixed in an upper position 22 shown in FIG. 2 and a lower position 21 shown in FIG. 2A. At the lower end of the rod a hand grip is provided and at the upper end a pair of pivotal arms 15 and 16 are mounted which have yarn over-run elements 17 and 18 positioned at their free ends respectively.

In the lower position 21 (FIG. 2A), pivotal arms 15, 16 are held in a defined closed position by spring 23 and stop 24 which is fitted therebetween. In this closed position, the yarn guide can pass through the narrowest gap between the heating plate 6 and cooling plate 7.

At a predetermined point in the region of the *apex of the acute* angle formed between the *outlet end of* heating plate 6 and *the inlet end of* cooling plate 7, fixed stops 19 and 20 are provided for the purpose of spreading pivotal arms 15 and 16 sufficiently far apart so that yarn over-run elements 17, 18 will lie along lines substantially tangent to the outlet of the heating plate 6 and the inlet of the cooling plate 7 respectively.

In operation, the yarn is applied to the machine by first guiding it between delivery mechanism 5 at side frame 2 and the false-twisting device 8 and take-off mechanism 9 at the middle frame 1 via yarn over-run elements 17, 18 when yarn guide device 31 is located in its lowered position 21. Height-adjustable rod 13 is then raised to its upper position 22 by the machine operator where arms 15, 16 will be [cause] *caused* to pivot apart by fixed stops 19, 20 and the yarn will thereby be applied to heating plate 6 and cooling plate 7.

One of the chief advantages of the present invention is that as a result of the oblique orientation of heating plate 6 very great heating zone lengths and corresponding greater running speeds are possible. For example, in actual use heating plate lengths of two meters have been used. In addition, because of the oblique orientation, sufficient vertical space remains for reasonable operating heights. The arrangement also insures that the vapors generated during the heating of synthetic fibers which have been previously saturated with various treatment liquids can escape. Furthermore, this oblique orientation permits the accommodation of a cooling plate of sufficient length without the operating height of the machine becoming unacceptably large.

Mechanical assistance in applying the yarn to the machine is likewise only necessary in the region of the angle between the oblique heating plate and the vertical cooling plate. The design of the yarn guide device 31 having pivotal arms 15, 16 insures that the yarn can be applied slowly and with sufficient preheating to heating plate 6, which is at its operating temperature, and simultaneously to cooling plate 7 without the yarn suffering damage or breaking.

Yarn over-run elements 17, 18 are fixed in their operating position (FIG. 2) so that the yarn is held in complete contact with the heating plate 6 and cooling plate 7. The use of a pair of over-run elements offers the advantage that it assists in reducing the height of the machine. However, it would alternatively be possible to provide a single over-run element at a suitable greater height positioned within the angle formed between the heating plate and cooling plate to achieve such complete plate contact.

Furthermore, it has been found that in order to insure satisfactory contact of the yarn of the heating and cooling plates, the over-run elements need not lie along a line exactly tangent from the outlet of the heating plate and along a line exactly tangent from the inlet of the cooling plate. Also, the over-run elements preferably should be arranged in such a way that the yarn coming from heating plate 6 is initially deflected only slightly by over-run element 17 with respect to over-run element 18. In practice, it has been found that the angle of deflection of the yarn between over-run elements 17 and 18 should preferably be not more than 30 degrees. In this manner damage to the hot yarn coming from the outlet of heating plate 6 is avoided. Since the cooling of the yarn below a level to which it is highly [susceptable] *susceptible* to damage takes place so rapidly in the region of the yarn guide device, the angle of deflection of the yarn about over-run element 18 as its travels to cooling plate 7 is not critical.

Yarn over-run elements 17, 18 could alternatively be mounted on the machine frame rather than rod 13. In [this] *that* case, in order to apply the yarn and operate the machine, a lift rod would be utilized to apply the yarn onto the over-run elements.

However, in applying yarn and setting up the machine with the embodiment of the machine shown in FIG. 1, the yarn is first removed from the supply bobbin 3 and then located in the delivery mechanism 5 via yarn guides 33 located on either side thereof. Subsequent to yarn guide 33 the yarn is routed through false-twisting device 8, take-off mechanism 9 and the following elements located at middle frame 1. The yarn is then applied to over-run elements 17, 18 by means of a manual lift rod or, as illustrated in FIG. 1, the yarn is directly laid upon over-run elements 17, 18 when guide device 31 and height-adjustable rod 13 is in its lower position 21 as shown in FIG. 2A. From this position, rod 13 is raised into its operative position 22 as shown in FIG. 2 wherein the yarn is brought into contact with heating plate 6 and cooling plate 7.

While several particular embodiments of the present invention have been shown and described, it should be understood that various obvious changes and modifications thereto may be made, and it is therefore intended in the following claims to include all such modifications and changes as may fall within the spirit and scope of this invention.

What is claimed is:

1. A false-twist crimping machine for processing filament yarn, said machine comprising:

a side frame having a bobbin located thereon for supplying the filament yarn, a delivery means for guiding said yarn to an upwardly inclined heating zone, a middle frame carrying a downwardly disposed cooling zone which receives said yarn as it feeds from said heating zone, a false-twisting means for receiving said yarn as it feeds from said cooling zone, a take-off for supplying said yarn emitting from said false-twisting means to a winding device located at said middle frame, said heating zone sloping at an oblique angle between said side frame and said middle frame, and a yarn guide means positioned at the angle formed between said heating zone and cooling zone in a manner so that said yarn may run over it along a line substantially tangent from the outlet of said heating zone and along a line substantially tangent to the inlet of said cooling zone.

2. The false-twist crimping machine of claim 1 wherein said heating zone comprises a downwardly directed contact surface along which said yarn travels.

3. The false-twist crimping machine of claim 1 wherein said yarn guide means is mounted on a height-adjustable rod whose guide path is located in the angle formed between said heating zone and said cooling zone.

4. The false-twist crimping machine of claim 3 wherein said yarn guide means further comprises a pair of pivotal arms mounted on the upper end of said height-adjustable rod, said pivotal arms having yarn over-run elements positioned at their upper ends, said arms being caused to pivot apart in the region of the angle formed between said heating zone and said cooling zone by fixed stops provided at a predetermined location therein.

5. The false-twist crimping machine of claim 1 wherein said yarn guide means comprises at least one yarn over-run element which is positioned along a line substantially tangent to the inlet of said cooling zone and is displaced by not more than 30° from a line substantially tangent to the outlet of said heating zone.

*6. A falst-twist crimping machine for processing filament yarn, said machine comprising:*

*a side frame having bobbins located thereon for supplying filament yarn;*

*a middle frame laterally spaced from said side frame and defining a service passage therebetween for movement thereabout of a machine operator;*

*yarn heating means having an inlet end and an outlet end and defining an elongate heating zone terminating above the height of said side frame;*

*yarn delivery means associated with said side frame and said heating means for guiding the yarn to the inlet end of said heating means;*

*yarn cooling means associated with said middle frame and having an inlet end and an outlet end and defining an elongate cooling zone;*

*said heating means and said cooling means being angularly disposed relative to each other so that the inlet end of said heating means and the outlet end of said cooling means are disposed on opposite sides of said service passage, and the outlet end of said heating means and the inlet end of said cooling means are closely adjacent each other and generally form the apex of an acute angle with said apex being located at a height above said side frame, whereby the yarn is directed upwardly in the heating zone and downwardly in the cooling zone during processing;*

*yarn guide means positioned generally at said apex between the adjacent ends of said heating and cooling means for guiding the yarn from the heating zone to the cooling zone;*

*false twisting means carried by said middle frame for receiving the yarn from said cooling means; and*

*winding means carried by said middle frame for winding the processed yarn.*

*7. The false-twist crimping machine of claim 6 wherein said yarn heating means has a length greater than the width of said service passage.*

* * * * *

UNITED STATES PATENT OFFICE

CERTIFICATE OF CORRECTION

PATENT NO. : RE 30,159

DATED : November 27, 1979

INVENTOR(S) : Hermann Kubler

It is certified that error appears in the above-identified patent and that said Letters Patent are hereby corrected as shown below:

Column 2, line 48, after "hand" insert --half--;
Column 4, line 53, "of" (second occurrence) should read --on--.

Signed and Sealed this

*Eighteenth* Day of *March 1980*

[SEAL]

*Attest:*

SIDNEY A. DIAMOND

*Attesting Officer*

*Commissioner of Patents and Trademarks*